(12) United States Patent
Bostik

(10) Patent No.: US 7,234,627 B2
(45) Date of Patent: Jun. 26, 2007

(54) METHOD OF JOINING COILED SUCKER ROD IN THE FIELD

(76) Inventor: Karel Bostik, 15116-86 Street, Edmonton, Alberta (CA) T5E 5X6

( * ) Notice: Subject to any disclaimer, the term of this patent is extended or adjusted under 35 U.S.C. 154(b) by 656 days.

(21) Appl. No.: 10/666,138

(22) Filed: Sep. 18, 2003

(65) Prior Publication Data
US 2004/0056076 A1     Mar. 25, 2004

(30) Foreign Application Priority Data
Sep. 23, 2002   (CA) .................................. 2404575

(51) Int. Cl.
*B23K 31/02* (2006.01)
*B23K 35/24* (2006.01)
(52) U.S. Cl. .................................. 228/234.1; 228/232
(58) Field of Classification Search ............ 228/234.1, 228/232, 262.1; 219/121.51, 121.57
See application file for complete search history.

(56) References Cited

U.S. PATENT DOCUMENTS

| | | | | |
|---|---|---|---|---|
| 2,354,267 A | * | 7/1944 | Lytle et al. ................. | 228/125 |
| 3,060,563 A | * | 10/1962 | Berg ........................... | 228/199 |
| 3,591,757 A | * | 7/1971 | Rudd ........................... | 219/67 |
| 3,998,682 A | * | 12/1976 | Harmsen ...................... | 156/158 |
| 4,121,748 A | * | 10/1978 | Yokokawa et al. ......... | 228/102 |
| 4,142,713 A | * | 3/1979 | Nakasugi et al. ............. | 266/87 |
| 5,406,688 A | | 4/1995 | Hayashi ....................... | 29/505 |
| 5,880,425 A | | 3/1999 | Carnes, Jr. .................. | 219/112 |
| 6,059,175 A | * | 5/2000 | Hamada et al. ............. | 228/194 |
| 7,156,176 B2 | * | 1/2007 | Vinegar et al. ............. | 166/302 |

* cited by examiner

*Primary Examiner*—Lynne R. Edmondson
(74) *Attorney, Agent, or Firm*—Davis Bujold & Daniels, P.L.L.C.

(57) ABSTRACT

A method of joining coiled sucker rod in the field. In its most basic form, the method includes a first step of placing abutting ends of sucker rod in face to face relation. A second step involves positioning a gas burner in proximity to the abutting ends of sucker rod and heating the abutting ends with a hydrocarbon gas flame while applying axial pressure to force the abutting ends together. A third step involves continuing heating and applying pressure until a weld is formed with a bulge formed above the weld which is at least one third of the diameter of the welded rod. A fourth step involves keeping the pressure constant until the weld cools.

10 Claims, 1 Drawing Sheet

METHOD OF JOINING COILED SUCKER ROD IN THE FIELD

FIELD OF THE INVENTION

The present invention relates to welding with hydrocarbon gas.

BACKGROUND OF THE INVENTION

Continuous coiled sucker rod has been used in oil wells for the last 32 years. It is assembled in manufacturing plants from a number of pieces of steel rod supplied by a steel mill using a flash-butt welding machine. This is the most effective and reliable method of joining coiled sucker rod.

During installation of a coiled sucker rod and servicing of wells with a coiled sucker rod the need for joining two pieces of a coiled sucker rod quite often arises. Several methods of joining the continuous coiled sucker rod in the field were considered and experimented with (such as mechanical joints or explosive welding and hand welding with portable electrical welding machines etc.) and found impractical.

At present time the only reliable and practical method of joining a continuous coiled sucker rod in the field is electrical flash-butt welding with a truck or a trailer mounted flash-butt welder; all field-joining of coiled sucker rod is done using this method. This is a very much the same method as the one used in a manufacturing plant. The biggest drawback of this method is its huge requirement of electric power, which has to be supplied from many large, heavy, and expensive batteries. These batteries need to be recharged very often and their life is limited.

SUMMARY OF THE INVENTION

What is required is an alternative welding method which is suitable for use in joining coiled sucker rod in the field.

According to the present invention there is provided a method of joining coiled sucker rod in the field. In its most basic form, the method includes a first step of placing abutting ends of sucker rod in face to face relation. A second step involves positioning a gas burner in proximity to the abutting ends of sucker rod and heating the abutting ends with a hydrocarbon gas flame while applying axial pressure to force the abutting ends together. A third step involves continuing heating and applying pressure until a weld is formed with a bulge formed above the weld which is at least one third of the diameter of the welded rod. A fourth step involves keeping the pressure constant until the weld cools.

This special gas pressure welding method was developed for welding parts of a coiled sucker rod in the field. In this method the butted sections of the sucker rod are subjected to heat and pressure to form a weld. The method allows use of a light portable welding apparatus which is much smaller and less expensive than the heavy and cumbersome flash-butt welding machines used for welding of coiled sucker rod in the field at the present time. A critical aspect of the current method lies in eliminating any possible inclusions in the weld by displacing metal from the abutting faces of the welded rod ends into the narrow bulge created above the weld. To achieve this, the height of the bulge must be greater than one third of the diameter of the sucker rod being welded.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The preferred method will now be described with reference to FIGS. 1 through 5.

Figure 1:
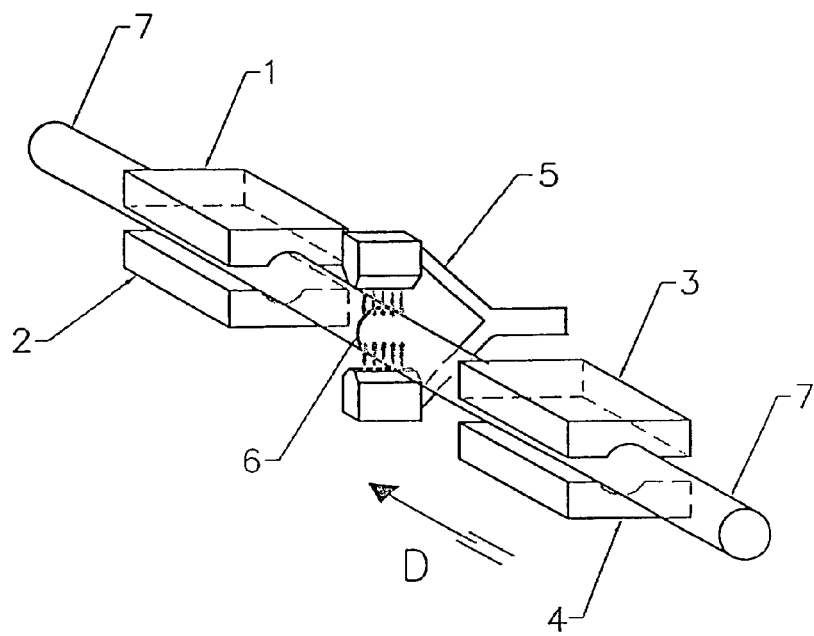
FIG. 1 is a perspective view of coiled sucker rod being joined in the field in accordance with the teachings of the present method.

Referring to FIG. 1 two ends of coiled sucker rod 7 are held between stationery jaws 1, 2 and movable jaws 3, 4. Abutting ends 6 of rods 7 are in full contact, and multi-nozzle burner 5 is in position for heating rod ends 6. After the desired temperature is reached, movable jaws 3, 4 will start moving toward stationery jaws 1, 2 in direction D, compressing ends of rods 6, and welding two parts of rod 7 in to one rod.

Figure 2:
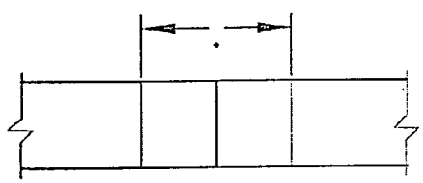
FIG. 2 labelled as PRIOR ART is a detailed side elevation view of coiled sucker rod in the process of being heated in accordance with conventional method.
Figure 3:
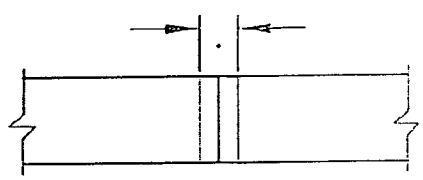
FIG. 3 is a detailed side elevation view of the coiled sucker rod placed illustrated in FIG. 1 in end to end relation and being heated in accordance with the teachings of the present invention.
Figure 4:
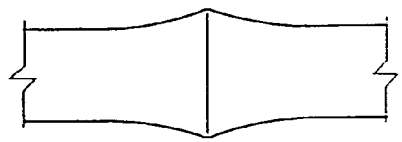
FIG. 4 labelled as PRIOR ART is a detailed side elevation view of coiled sucker rod treated by conventional welding methods after bulge formation.
Figure 5:
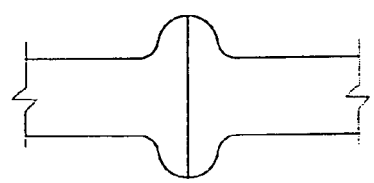
FIG. 5 is a detailed side elevation view of the coiled sucker rod placed illustrated in FIG. 1 after bulge formation.

FIG. 2 shows heated area of welded rods when welded using known methods, in contrast, FIG. 3 shows heated area of welded rods when welded using new method. FIG. 4 shows the bulge formed on a welded rod when welded using known methods, in contrast, FIG. 5 shows the bulge formed on welded rod when welded using new method.

The method, as will be hereinafter described, provides a reliable method of joining parts of a coiled sucker rod in the field without the need for expensive and cumbersome equipment. Furthermore, this method allows the doing of many welds without the need for accessing an electrical power source for recharging batteries. In this invention the source of energy used to weld the metal rods is a flammable gas instead of an electrical power source. This means that batteries and a heavy-duty electrical switch for switching the welding current, as well as a compressor supplying the air to operate the electric power switch, is eliminated. A welding machine can be much simpler, lighter and less expensive and require negligible maintenance in comparison with a flash-butt welder. In accordance with this gas pressure welding process, the parts of a coiled sucker rod can be welded with the tensile properties and elongation of the welded joint being similar to those of joints resulting from welding with a flash-butt welder. Methods of welding similar to this invention have been used to join reinforcing bars for concrete, mostly in Japan. Most of the known methods utilize welding process containing many steps and requiring changing pressure on the rods, changing flow rates of heated gases and changing of the width of the heated area of the rod. All these variable call for a complicated system. The steel, which is used for a coiled sucker rod is one of much higher tensile strength than the steel used for concrete reinforcing bars, and using known methods of welding did not bring satisfactory results with the coiled sucker rod. Welding steel of higher strength and at the same time obtaining higher quality welds than those in concrete reinforcing bars presents special problems and requires a different approach. A high quality weld is essential, especially because the sucker rod, unlike concrete reinforcing bars, is exposed to a continuous cycling load. One of the differences between known methods and this new method is that in this method any possible undesirable inclusions in the weld are completely eliminated. This is done by eliminating the space between the ends of the rods to be welded, and also by completing welds with a large, narrow bulge. In other known methods of gas pressure welding instead of attempting to completely eliminate the air space between welded rod ends, a strongly carbonizing flame and introduction of additional acetylene through an extra nozzle is used during the first part of the welding cycle in order to prevent oxidation of said rod ends. In this invention there is no need for strongly carbonizing flame, nor for introduction of additional acetylene, and so there is no introduction of any additional carbon which may possibly (beside preventing oxidation of faces of welded rod) negatively affect chemical composition and in turn also quality of a weld.

The heated area of the welded rod in this method is quite narrow as shown in FIG. 3 as compared to the area heated with oscillating flame in known methods as shown in FIG. 2. As a result of heating narrow part of a rod to a higher temperature than used in previous methods, the bulge formed in the weld is also narrower and higher as shown in FIG. 5, compared to a weld done using known method in FIG. 4. The relatively narrow bulge, containing most of the metal from the abutting faces of welded rods and possibly some contaminations, is removed after welding. In known methods the finished weld contains most of the metal from abutting faces and possibly some undesirable contaminations. Other differences are in the temperature used for welding, and the welding cycle itself. The temperature used in this method, reaching 1450° C., is higher than temperatures used in known methods. The welding cycle in this invention does not include variation of pressure used to compress the ends of the welded rods, or variation in width of the heated area of the welded rod as are used in other known methods, and thus said cycle can be very easy controlled.

This invention provides a method for butt-welding of a coiled sucker rod, comprising of: preparation of the faces of two steel rods to be welded, said preparation has to assure that the faces of said rods are perfectly parallel and clean and there is no space at all between abutting ends of said rods (this can be achieved for example with abrasive cut-off wheel or a similar saw, located directly on the welding machine, and by cutting the ends of said rods already clamped in the welding jaws); bringing clamped ends of said rods in full contact; preheating a minimum length, which will vary depending on ambient temperature from 2 to 10 inches, of each rod end to temperature which will vary depending on ambient temperature from 150° C. to 300° C., in order to slow down cooling of the future weld; positioning the burner above said rod ends and heating of said rod ends up to a temperature at which surface of the abutting ends of welded rods starts to melt; applying a pressure of minimum 17 kg/mm$^2$ to said of rod crossection to compress the ends of the welded rods, while continuing heating; discontinuing heating when the bulge in the joint of said welded bars reaches a height equal to or greater than one third of the diameter of the welded rod, while keeping said pressure; enclosing said weld in the thermal insulation to slow cooling of the weld and prevent forming brittle structure of the weld due to quick cooling, immediately after the heating flame is shut off; letting said weld cool down to ambient temperature.

Depending on the chemistry of the welded rod, instead letting said weld cool down to ambient temperature immediately after the heating flame is shut off, the alternative is to "heat-treat" said weld to improve its mechanical properties.

Some of the materials used for a coiled sucker rod, such as steel 4330M and similar materials, need to be heat-treated after welding in order to improve their mechanical properties. In the preferred method of heat-treatment the weld is reheated up to temperature just below the grain size transformation range, temperature between 570° C. to 600° C. and kept at this temperature for approximately 20 minutes, then allowed to slowly cool to ambient temperature.

Burners comprising rows of nozzles facing each other or arranged in a circle are used to heat the abutting ends of the welded rods. Acetylene and oxygen is usually used for heating, but other hydrocarbon gases may be used.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive Property or privilege is claimed are defined as follows:

1. A method of joining coiled sucker rod in the field, comprising the steps of:
   placing abutting ends of sucker rod in face to face relation;
   positioning a gas burner in proximity to the abutting ends and heating the abutting ends with a hydrocarbon gas flame while applying axial pressure to force the abutting ends together;
   continuing heating and applying pressure until a weld is formed with a bulge formed above the weld, the bulge having the height at least one third of the diameter of the sucker rod being welded; and
   keeping the pressure constant until the weld cools; and
   the pressure being at least 17 kg/mm$^2$ of the cross section of the welded rod.

2. The method as defined in claim 1, further including a preparatory step of preparing the abutting ends of the sucker rod to create clean, smooth and parallel faces using a saw, located directly on the welding machine, and by cutting the ends of said rods already clamped in the welding jaws.

3. The method as defined in claim 1, further including a preparatory step of preheating the abutting ends of the sucker rod.

4. The method as defined in claim 3, the abutting ends of the sucker rod being preheated for a length depending on ambient temperature and ranging from two to ten inches each.

5. The method as defined in claim 3, the sucker rod being preheated to temperature which will vary depending on ambient temperature between 150 and 300 degrees Celsius.

6. The method as defined in claim 1, the sucker rod being heated to a temperature of 1450° C. at which the surface of the welded rods begins to melt.

7. The method as defined in claim 1, including the further step of. immediately after welding, enclosing the weld in thermal insulation thereby slowing down the cooling rate of the weld.

8. The method as defined in claim 1, including the further step of heat-treatment the weld after welding, the weld being allowed to cool to ambient temperature and than being reheated up to temperature between 570° C. and 600° C. and kept at this temperature for approximately 20 minutes, then allowed to cool slowly to ambient temperature.

9. The method as defined in claim 1, the height of the bulge being one third of the diameter of the welded sucker rod or greater.

10. A method of joining coiled sucker rod in the field, comprising the steps of: butt-welding a sucker rod, comprised of the steps of preparing the ends of sucker rods or attachments to said sucker rod using the tools which will assure creation of clean, smooth, and parallel faces of said rods; bringing said faces in full contact; preheating a minimum length of 2 inches of the end of each of said rods up to 300° C. with hydrocarbon gas; positioning the gas burner over the abutting ends of said rods and starting the heating of said rod ends with a hydrocarbon gas flame, up to temperature at which the surface of the welded rods begins to melt; applying pressure equal to or higher than 17 kg/mm$^2$ of the crossection of the welded rod during welding, while continuing heating; discontinuing heating when the height of the bulge formed above the weld has reached at least one third of the diameter of the welded rod, while keeping said pressure at the constant level until the joint cools.

* * * * *